United States Patent
Iatsun et al.

(10) Patent No.: US 11,580,774 B2
(45) Date of Patent: Feb. 14, 2023

(54) METHOD FOR THE CLASSIFICATION OF A BIOMETRIC TRAIT REPRESENTED BY AN INPUT IMAGE

(71) Applicant: IDEMIA IDENTITY & SECURITY FRANCE, Courbevoie (FR)

(72) Inventors: Iana Iatsun, Courbevoie (FR); Laurent Kazdaghli, Courbevoie (FR)

(73) Assignee: IDEMIA IDENTITY & SECURITY FRANCE, Courbevoie (FR)

(*) Notice: Subject to any disclaimer, the term of this patent is extended or adjusted under 35 U.S.C. 154(b) by 0 days.

(21) Appl. No.: 17/100,361

(22) Filed: Nov. 20, 2020

(65) Prior Publication Data
US 2021/0158014 A1 May 27, 2021

(30) Foreign Application Priority Data
Nov. 25, 2019 (FR) .................................. 1913172

(51) Int. Cl.
*G06V 40/12* (2022.01)
*G06N 3/08* (2006.01)
*G06V 40/13* (2022.01)

(52) U.S. Cl.
CPC ........... *G06V 40/1371* (2022.01); *G06N 3/08* (2013.01); *G06V 40/13* (2022.01); *G06V 40/1353* (2022.01); *G06V 40/1359* (2022.01)

(58) Field of Classification Search
CPC .......... G06K 9/00093; G06K 9/00013; G06K 9/00073; G06K 9/0008; G06N 3/08
See application file for complete search history.

(56) References Cited

U.S. PATENT DOCUMENTS

| | | | | |
|---|---|---|---|---|
| 5,825,907 A | * | 10/1998 | Russo | G06K 9/0008 382/124 |
| 2018/0165508 A1 | * | 6/2018 | Othman | G06K 9/42 |
| 2019/0171899 A1 | | 6/2019 | Cecchi et al. | |
| 2019/0280869 A1 | * | 9/2019 | Streit | H04L 9/3231 |
| 2019/0311248 A1 | | 10/2019 | Fleishman et al. | |
| 2020/0065563 A1 | * | 2/2020 | Zou | G06K 9/00288 |
| 2021/0281918 A1 | * | 9/2021 | Su | H04N 21/4666 |
| 2021/0383538 A1 | * | 12/2021 | Deasy | G06N 3/084 |

OTHER PUBLICATIONS

Yuanyi Zhong et al, "Towards End-to-End Face Recognition through Alignment Learning", Jan. 25, 2017, p. 1-8, figures 1-8, Cornell University Library, Ithaca, NY, 14853.

* cited by examiner

Primary Examiner — Lixi C Simpson
(74) Attorney, Agent, or Firm — Womble Bond Dickinson (US) LLP

(57) ABSTRACT

The present invention relates to a method for classifying a biometric trait represented by an input image, the method being characterized in that it comprises the implementation, by data processing means (21) of a client (2), of the steps of:
(a) Determining, for each of a predefined set of possible general patterns of biometric traits, by means of a convolutional neural network, CNN, whether said biometric trait presents or not said general pattern.

14 Claims, 2 Drawing Sheets

[Fig 1]
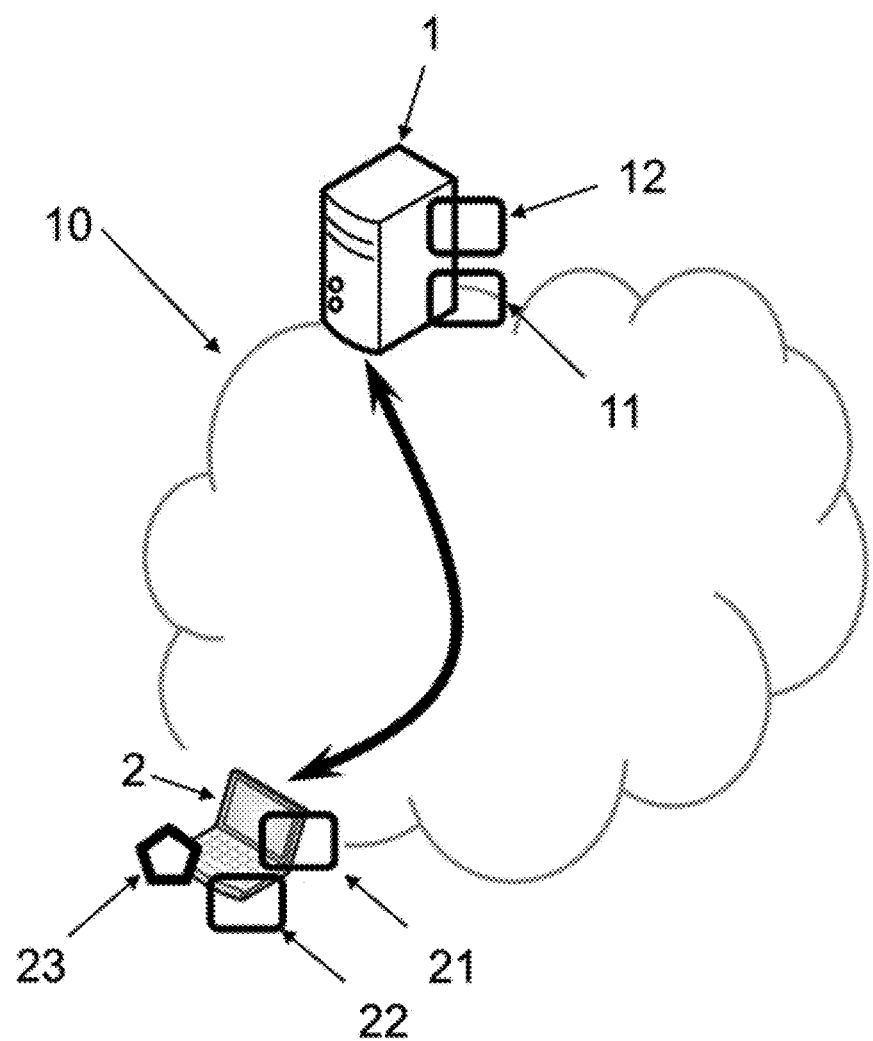

[Fig 2]
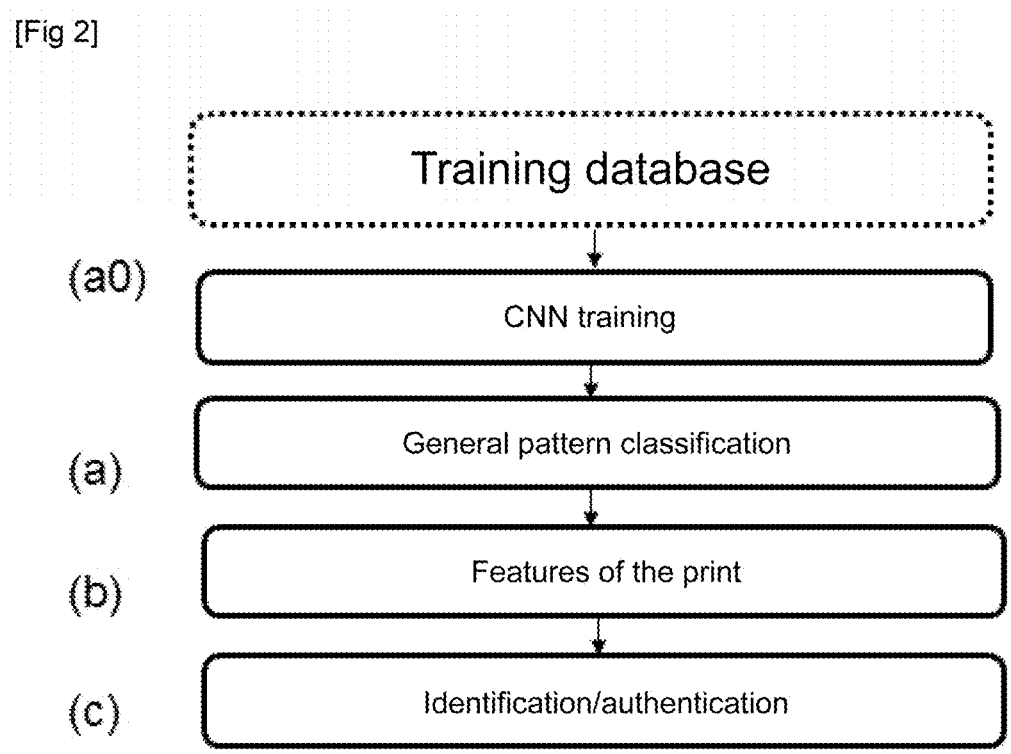
[Fig 3]
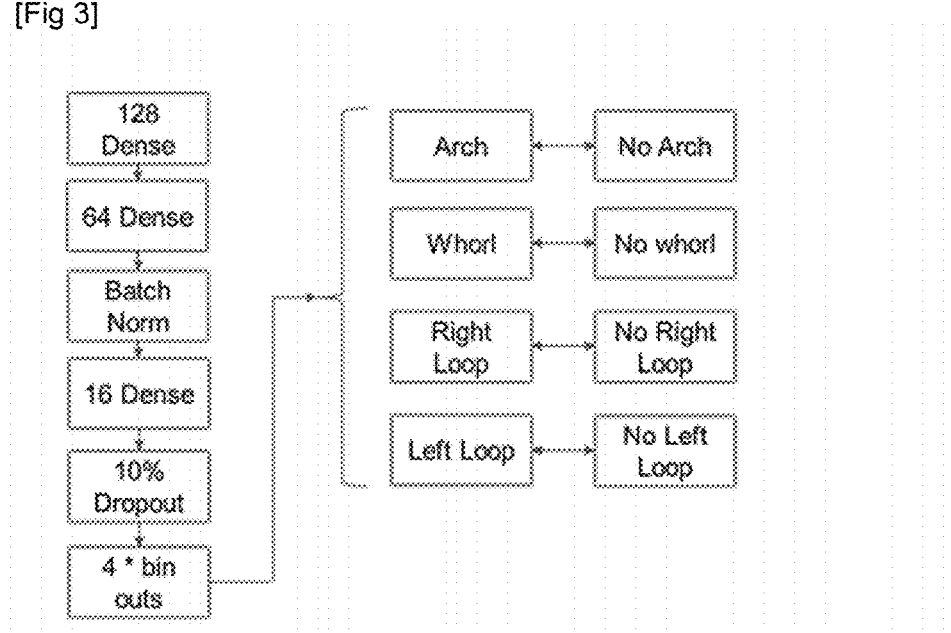

METHOD FOR THE CLASSIFICATION OF A BIOMETRIC TRAIT REPRESENTED BY AN INPUT IMAGE

GENERAL TECHNICAL FIELD

The invention relates to the field of biometrics, and in particular, it proposes a method for classifying a biometric trait represented by an input image by means of at least one convolutional neural network, as well as a method for the training of the convolutional neural network.

STATE OF THE ART

Biometric authentication/identification consists in recognizing an individual on the basis of biometric traits of that individual, such as the fingerprints (fingerprint recognition), the palm prints, the retinal prints, the iris or the face (facial recognition).

Conventional biometric approaches utilize characteristic information from the biometric trait extracted from the acquired biometry, called features, and the training/classification is performed on the basis of a comparison of these features.

In particular, in the case of fingerprint recognition, fingertip images are processed so as to extract the features of a print that can be classified into three categories:

Level 1 defines the general pattern of such a print (one of four or five classes: right loop, left loop, arch, possibly tented arch and spiral), and the overall layout of the ridges (in particular, an orientation map called a "Ridge Flow Matrix"—RFM map—is obtained, which represents the general direction of the ridge at each point of the print).

Level 2 defines the particular points of the prints called minutia, which constitute "events" along the ridges (end of a ridge, bifurcation, etc.). Conventional recognition approaches essentially use these features.

Level 3 defines more complex information such as the shape of the ridges, pores of the skin, scars, etc.

The method of extracting features from a print (in the form of feature maps) is called "encoding," These features make it possible to produce a signature called a "template", encoding the useful information during the final phase of classification. More specifically, the classification is performed by comparing the feature maps obtained with one or more reference feature map(s) associated with known individuals.

The main difficulty lies in the response time when it is required to perform the identification, insofar as it is necessary to make as many comparisons as there are individuals within the database of known individuals.

To save time, it was proposed to extract the Level 1 features (general pattern of the print) by means of deep learning. More specifically, the print is classified from amongst a plurality of known types by means of a neural network, in such a way as to limit the number of individual candidates and therefore the number of comparisons to be made. The document *Ruxin Wang, Congying Han, Yanping Wu and Tiande Guo; Fingerprint Classification Based on Depth Neural Network*, thus proposes a so-called "fuzzy" classification of the print from the orientation map thereof, obtained by means of pretreatment.

However, this method proves to be ineffective for damaged prints and in particular so-called latent prints, such as those found at a crime scene. Indeed, two latent images of prints of the same identity can have, in relation to one another, significant rotations, occultations as well as a set of distortions, such that obtaining the orientation map is a real challenge.

The document *Michelsanti, Daniel; Ene, Andreea-Daniela; Guichi, Yanis; Stef, Rares; Nasrollahi, Kamal; Moeslund, Thomas B; Fast Fingerprint Classification with Deep Neural Networks*, has demonstrated that it is possible to assess the overall pattern of the print directly, without pretreatment, by means of a VGG-S neural network. This technique makes it possible to dispense with the need for orientation maps, but in practice proves not to be better for latent prints, the performance thereof being good only for well oriented, good quality prints.

It would therefore be desirable to have a more efficient classification solution for biometric trait images, in particular for latent prints, in order to extract the features thereof.

BRIEF DESCRIPTION OF THE INVENTION

According to a first aspect, the present invention relates to a method for the classification of a biometric trait represented by an input image, the method being characterized in that it comprises the implementation, by processing means of client data, of the steps of:

(a) Determining, for each of a predefined set of possible general patterns of biometric traits, by means of a convolutional neural network, CNN, whether said biometric trait has or not said general pattern.

According to advantageous and non-limiting characteristics:

Said CNN has at least one residual connection.

Said CNN has at least one so-called dense block having all possible residual connections.

Said CNN comprises a plurality of dense blocks, with the size of the feature maps of the dense blocks decreasing from the input to the output of the CNN and/or a number of layers per dense block increasing from the input to the output of the CNN.

A rate of decrease in the size of the feature maps of the dense blocks increases from the input to the output of the CNN.

The method comprises a prior training step (a0), by means of a server data processing, from an image database of biometric traits that have already been classified, of parameters of said CNN.

Step (a0) comprises the random deactivation of the layers of said dense block, preferably with a probability of around 10%.

The method comprises a step (b) of processing said input image such as to extract features of interest from the biometric trait represented by said input image.

Said biometric traits are fingerprints, the features of interest to be extracted from the at least one fingerprint represented by said input image comprising the position and/or orientation of minutia;

The at least one biometric trait represented by the input image is that of an individual, the method further comprising a step (c) of identifying or authenticating said individual by comparing the features of interest extracted from the biometric trait represented by said input image, with reference biometric trait features having the general pattern or patterns determined in step (a) as presented by the biometric trait represented by the input image.

Said biometric traits are fingerprints, and said predefined set of possible general patterns comprises the following general patterns: left loop, right loop, arch and spiral.

According to a second and a third aspect, the invention relates to a computer program product comprising code instructions for the execution of a method according to the first aspect of classification of a biometric trait represented by an input image; and storage means that can be read by computer equipment whereupon a computer program product comprises coded instructions for executing a method according to the first classification aspect of a biometric trait represented by an input image.

DESCRIPTION OF THE FIGURES

Other characteristics and advantages of the present invention will appear upon reading the following description of a preferred embodiment. This description will be given with reference to the attached drawings in which:

FIG. 1 is a diagram of an architecture for implementing the method according to the invention;

FIG. 2 shows the steps of a preferred embodiment of the method according to the invention;

FIG. 3 shows an example of a convolutional neural network architecture for the implementation of the method according to the invention.

DETAILED DESCRIPTION

Principle and Architecture

According to two additional aspects of the invention, the following is proposed:
  a method for classifying a biometric trait represented by an input image, by means of a convolutional neural network, CNN, and, if applicable, by extraction of features of interest from the biometric trait represented by the input image;
  A training method for the settings of said CNN.

The input or training data are of the image type, and are representative of a biometric trait (in other words they are images of the biometric trait, i.e. whereupon the biometric trait is visible), advantageously selected from a fingerprint, a palm print, a retinal scan, etc., and generally any print that may be represented by an image and uniquely associated with an individual. Preferably said biometric trait is a fingerprint and this example will be used in the following part of the description (as will be seen, the present method is particularly effective especially in the case of latent prints).

The term classification refers to the determination of at least one "general pattern" of the biometric trait as represented by the input image, i.e., a level 1 feature of the print. This classification is distinguished here from an identification/authentication of an individual carrying the biometric trait (i.e., the determination of an identity associated with the print) which can also be called the classification of the biometric trait.

The general pattern defines the overall structure of the print and makes it possible to distinguish several types of biometric traits.

As such, it is assumed that there is a predefined set of possible biometric trait general patterns. Generally, in the case of fingerprints this set conforms to the so-called "Henry System" proposed in 1900, and typically comprises (preferably only) the following general patterns:
  Loop on the left ("left loop" in the Henry system)—the print has a "core" and a "delta" located at the bottom left of the core;
  Loop on the right ("right loop" in the Henry system)—the print has a core and a delta located at the bottom right of the core;
  Arch ("arch" in the Henry system)—the print has a delta and optionally a core one above the other;
  Spiral ("whorl" in the Henry system)—the print has two cores and two deltas.

It is to be noted that the present invention is not limited to these four general patterns, insofar as there are sometimes other general fingerprint patterns such as the "double loop" or "tented arch." The spiral can in turn be distinguished as two patterns according to the direction of rotation. Conversely, general left and right loop patterns are sometimes grouped under the general pattern "loop".

The person skilled in the art will be able to adapt this method to any predefined set of possible general patterns for any biometric trait.

The principle underlying the present method lies in not considering this classification as the selection of a general pattern of the print of the input image from amongst said predefined set of possible general biometric trait patterns (i.e., a multi-class classification, in other words, a classification into multiple classes), but rather in determining, for each of a predefined set of eventual general patterns of the biometric trait, whether or not said biometric trait presents or not said pattern (i.e., a multiple binary classification wherein each class does not exclude the other, what is also called a multi-label classification).

For example, instead of determining whether the general pattern of a print is a right loop, left loop, arch or spiral (i.e., a selection from amongst four general patterns), the determination is whether or not it is of the right loop type, whether or not it is of the left loop type, whether or not it is of the arch type, and whether or not it is of the spiral type. It is thus theoretically not impossible for a biometric trait to be identified as being of several types, i.e., it simultaneously has two general patterns, even though the vast majority of prints will be clearly identified as having a single general pattern.

For n possible general biometric trait patterns within said predefined set, there are thus $2^n-1$ possible combinations (as shall be seen below, it is not possible for a biometric trait not to have a general pattern), for example 15 combinations for 4 general patterns. This number $2^n-1$ possible combinations can be understood to be n initial classes (one general pattern) plus $2^n-n-1$ classes "more complex" (at least two general patterns, for example a double loop if there is one loop on the left+loop on the right).

The selection of such a multiple classification, in practice, significantly improves the performance of a CNN implementation. In other words, having to necessarily select one general pattern (i.e., to exclude the others) may disrupt neural networks, whereas here the present solution no longer has this requirement. An advantage is particularly observed with latent prints having distortions and occlusions, wherewith a number of general patterns may be candidates.

The eventual extraction of features of interest that may follow typically consists in "encoding" the print represented by the input image, i.e. said features of interest to be extracted are typically "biometric" features, namely "final" features making it possible to compose a template of the print in the form of a biometric trait of an individual with a view to identifying/authenticating the individual, see below. In this respect, in the case of fingerprints, said features of interest typically describe minutia, i.e. they comprise the position and/or orientation of the minutia. However, it will be understood that the present method is not limited to this embodiment, and all of the eventual biometric features of interest can be extracted.

The present methods are implemented within an architecture such as that shown in FIG. 1, with a server 1 and a client 2. The server 1 is the training device (implementing the training method) and the client 2 is an operational device (implementing the classification method and, if applicable the extraction of features), for example a user terminal.

It is quite possible that the two devices 1, 2 are combined, but preferably the server 1 is that of a security solution provider and the client 2 consumer equipment, in particular a biometric trait scanner but also a smartphone, a personal computer, etc. The client device 2 advantageously comprises optical acquisition means 23, in such a way as to directly acquire said input image, typically for direct processing, alternatively the input image is loaded onto the client device 2 (for example, latent prints can be photographed at a crime scene by a forensic team, and these photographs can then be loaded onto dedicated client 2 equipment back at the forensic laboratory.).

In any case, each device 1, 2 is typically a remote computer equipment connected to an extended network 10 such as the Internet for the exchange of data. Each comprises data processing means 11, 21 of the processor type, and data storage means 12, 22 such as computer memory, for example a flash memory or a hard disc.

The server 1 stores a training database, i.e., a set of previously classified biometric trait images (i.e. wherein it is already known, for each of the said predefined set of possible general biometric trait patterns, whether or not the print presents this general pattern) as opposed to the so-called input images that we are actually trying to process.

Method

In summary, referring to FIG. 2, the present method for the classification of a biometric trait represented by an input image essentially comprises a step (a) for determining, for each of a predefined set of possible general biometric trait patterns, by means of a convolving neural network, CNN, whether or not said biometric trait has or not said general pattern. In other words, as many booleans are obtained as possible general biometric trait patterns within said predefined set (the value previously referred to as n). As such the output of the CNN typically is a dimensional vector n or 2n (if there is also a score for each pattern that is representative of the probability that the print presents that pattern).

In an optional step (b), said input image is advantageously processed in such a way as to extract features of interest of the biometric trait represented by said input image. As will be seen, the method may further comprise a step (c) for the identification or authentication of at least one individual by comparing the features of interest extracted from the biometric trait represented by said input image, with reference biometric trait features having the general pattern(s) determined in step (a), as presented by the biometric trait represented by the input image: it is understood that this is a subgroup of the set of reference biometric traits, thereby limiting the number of comparisons to be made.

CNN

Said CNN can be of many types, including a conventional CNN (direct succession of CONV convolution layers, BN batch normalization layers, and NL non-linear layers). According to a preferred embodiment, said CNN is of the residual network type. It can be seen that such residual networks are very effective for pure binary classification (determining whether or not a general pattern is present), and much lighter than many image processing CNNs, such as detection CNNs.

A residual network, or RESNET, is a CNN with at least one "residual connection" ("skip connection" or simply "short-cut"), i.e., a connection wherein at least one layer is "short-circuited", by analogy with what is found in the pyramidal neurons of the brain. Indeed, when a model is made more complex by adding layers, some of these layers can have a negative impact on the performance of the model. Residual connections ensure that if a useful transformation is not learned, one layer must at worst learn the identity, avoiding degrading the performance of the other layers. The operating principle behind the residual networks is to add point by point the entry and exit of a convolution layer, allowing the signal to propagate from the superficial layers to the deeper ones. As explained, this network provides excellent results especially in pure classification. Conventionally within such a ResNet for the implementation of the present method, there is, for example, within a block, a main branch (short-circuited by the residual connection) with a plurality of convolution layers potentially followed by a non-linear layer (for example ReLU) and/or a batch normalization layer. The output of this branch is typically added point by point to the input image (by virtue of the residual connection), and passes through a final dimensional reduction layer (typically an AveragePool or MaxPool layer), A fully connected layer allows for the generation of the output vector (i.e., the result of the classification), and each binary output may include the activation function thereof, in particular of the Softmax type, see below.

Preferably, referring to FIG. 3, the CNN is also of the "densely connected" network type (or just dense network, or DENSENET); that is to say that not only does it have at least one residual connection, but within at least one so-called dense block it comprises all possible residual connections, i.e., each residual connection connecting an input of a first layer of the block to an output of a second layer of the block downstream of the first layer. As shall be seen below, the concept of a layer should be understood here as being limited to the convolution layers (i.e., the nonlinear layers or batch normalization layers are not short-circuited) or "convolution units" insofar as, in particular, 1×1 convolution layers may be added before the "active" convolution layers (usually 3×3) in order to reduce the number of feature maps at the input.

In other words, for a dense block with k layers, there are:
- k residual connections shorting respectively the $1^{st}$, $2^{nd}$ ... the $k^{th}$ layer;
- k−1 residual connections shorting respectively the $1^{st}$ and the $2^{nd}$ layer, the $2^{nd}$ and the $3^{rd}$ layer, . . . the k−1th layer and the $k^{th}$ layer;
- k−2 residual connections shorting respectively from the $1^{st}$ to the $3^{rd}$ layer, from the $2^{nd}$ and the $4^{th}$ layer, . . . from the $k^t$-$2^{nd}$ layer to the $k^{th}$ layer;
. . .
- 1 residual connection shorting respectively the 1st and the $2^{nd}$ layer, the $2^{nd}$ and the $3^{rd}$ layer, . . . the $k^t$-$1^{st}$ layer and the $k^{th}$ layer.

It is understood that the number of residual connection of a dense block with k layers therefore is $\Sigma^k i$, being $k(k-1)/2$, besides the k "normal" connections (from one layer to the next), for a total of $k(k+1)/2$ connections (direct or residual).

It is understood that a dense block with a constant size, i.e. the size of the input feature maps is the same as the size of the output feature maps, due to the absence of pooling layers (dimensionality reduction) within a dense block.

Advantageously, and as in the case of this example, the size of the dense block feature maps decreases from the input towards the output of the CNN and/or the number of layers per dense block increases from the input to the output of the CNN.

In the example of FIG. 2, there are three dense blocks, a first dense block with a feature map size of 128×128, a second dense block with an feature map size of 64×64, and a third dense block with a feature map size of 16×16. "Transition layers" may be arranged between two dense blocks precisely in order to enable a reduction in the size of the feature maps between two blocks (generally comprising a pooling layer and/or a batch normalization layer).

As explained, a dense block of the slightly more complex sets can be used, in the sense of elementary unit, as a "layer", such as a sequence of a 1×1 convolution layer and a 3×3 convolution layer (each optionally followed by a non-linear layer such as ReLU and/or a batch normalization layer), generally from 6 to 48 such elementary layer "units".

Preferably the CNN "decimates", that is to say, the CNN presents a very rapid reduction in the size of the feature map (mathematically, a rate of decrease in the size of the dense block feature maps increases from the input to the output of the CNN, in particular a division by two between the first and the second dense block, then by four between the second and the third dense block) and there is therefore an associated loss in accuracy, insofar as the determination of a general pattern requires only that the CNN "is interested" in details and not in the entire image (typically singular points of the core and delta type). Such an increasingly rapid reduction in the size of the feature maps makes it possible, as a bonus, to limit the memory footprint of the CNN and thus to facilitate the loading thereof onto simple client devices 2.

Furthermore, in a known manner, certain layers can be randomly disabled during training (see below), this is called "dropout" (usually with a given probability of 0% to 50%, and 10% in the example of FIG. 2). If one layer is deactivated, the neighboring layers become directly connected. Indeed, it is found that many layers make only a minimal contribution to the result, and that they can therefore be turned off without any consequences, but the total number of parameters is reduced, and therefore once again the memory footprint of the CNN.

Training

Advantageously, the method begins with a training step (a0), using the data processing means 11 of the server 1, from an image database of pre-classified biometric traits (i.e., for which it is known for each general pattern of the said predefined set of possible general patterns, if it is present), of the parameters of said CNN.

This training can be performed in a traditional way. The training cost function can be composed of an attachment to the conventional data—average quadratic error—and a total variation regularization.

As explained, the training step (a0) may comprise the random deactivation of layers according to a predetermined dropout rate (the probability that a layer is disabled) (for example 10%)

It should be noted that generally there are reference prints associated with a general pattern that is assumed to be THE general pattern presented by this reference print. This can be interpreted to mean that every other general pattern of said predefined set of possible general patterns are not presented by this reference print. It also remains possible to find rare reference prints that could, if applicable, introduce more general patterns.

Conventionally, it is possible in all cases to start from a database of good quality prints, and augmentation algorithms can be implemented in order to multiply the size of the training base and artificially produce latent prints (for example by deforming good quality prints creating occlusions therefrom, etc.) in order to ensure the robustness of the CNN to common acquisition defects.

The trained CNN can be stored as applicable on data storage means 22 of the client 2 for use in classification. It should be noted that the same CNN can be embedded on numerous clients 2, only one training is necessary.

Identification/Authentication

As explained, in a step (b), said input image can be processed in such a way as to extract said features of interest from the biometric trait represented by said input image, which notably can comprise the position and/or orientation of minutia in the case of fingerprints.

Preferably the method further comprises a step (c) of identifying or authenticating at least one individual by comparing the features of interest extracted from the biometric trait represented by said input image, with the features of reference biometric traits, which can be implemented in any way known by a person skilled in the art.

For example, the client 2 can store the features of the prints of one or more persons entered into a police file as reference prints, in such a way as to make it possible to identify the person who left a latent print: if the extracted features match those expected of a known individual, the identity of the latter is transmitted to the police.

Alternatively, the client 2 can send the extracted features to a remote database of said features of reference biometric traits, for the identification of the individual.

As explained, the present classification makes it possible to compare in step (c) the features of interest extracted from the biometric trait represented by said input image only with the features of the reference biometric trait having the general pattern or patterns determined in step (a), as presented by the biometric trait represented by the input image, hence saving time. It should be noted that it can be foreseen that if the result of the comparison is unsuccessful (i.e. no corresponding reference print is found) the features of interest extracted from the biometric trait represented by said input image can nevertheless be compared with the other features of reference biometric trait, in case the classification in step (a) is erroneous.

It should be noted that steps (b) and/or (c) may be implemented as a second classification step of a biometric trait, for example by means of one or more dedicated CNNs, and if applicable they can include processing for the improvement of isolated prints, see in particular the application FR 1860323.

Results:

A test based upon 100 latent prints, with the CNN according to FIG. 2, shows correct classification in 98.86% of cases, with in practice a 31% reduction in the number of reference prints to be tested for identification/authentication.

Computer Program Product

According to a second and a third aspects, the invention relates to a computer program product comprising code instructions for the execution (in particular on data processing means 11, 21 of the server 1 and/or of the client 2) of a method for classifying a biometric trait represented by an input image, as well as storage means readable by computer equipment (a memory 12, 22 of the server 1 and/or of the client 2) whereupon said computer program product is located.

The invention claimed is:

1. A method for classifying a biometric trait represented by an input image, the method being characterized in that it comprises the implementation, by data processing means of a client, of the steps of:
    (a) by means of a convolutional neural network (CNN), performing multi-label classification of the input image to determine for each general pattern of a predefined set of non-exclusive possible general patterns of biometric traits, a Boolean representative as to whether said biometric trait presents or not said general pattern.

2. The method according to claim 1, wherein said CNN has at least one residual connection.

3. The method according to claim 2, wherein said CNN comprises at least one dense block having all possible residual connections.

4. The method according to claim 3, wherein said CNN comprises a plurality of said dense blocks, with a size of feature maps of the dense blocks, decreasing from the input to the output of the CNN and/or a number of layers per dense block increasing from the input to the output of the CNN.

5. The method according to claim 4, wherein the rate of decrease in the size of the feature maps of the dense blocks increases from the input to the output of the CNN.

6. The method according to claim 1, comprising a prior training step (a0), by means of data processing means of a server, from an image database of pre-classified biometric traits, of parameters of said CNN.

7. The method according to claim 6 wherein said CNN has at least one residual connection and said CNN comprises at least one dense block having all possible residual connections, wherein the step (a0) comprises the random deactivation of layers of said dense block.

8. The method defined by claim 7 wherein the random deactivation of layers of said dense block has a probability of about 10%.

9. The method according to claim 1, comprising a step (b) for the processing of said input image in such a way as to extract the features of interest of the biometric trait represented by said input image.

10. The method according to claim 9, wherein said biometric traits are fingerprints, the features of interest to be extracted from the at least one fingerprint represented by said input image comprising the position and/or orientation of minutia.

11. The method according to claim 9, wherein the at least one biometric trait represented by the input image is that of an individual, the method further comprising a step (c) of identifying or authenticating said individual by comparing the features of interest extracted from the biometric trait represented by said input image, with the features of reference biometric traits having the general pattern or patterns determined in step (a) as presented by the biometric trait represented by the input image.

12. The method according to claim 1, wherein said biometric traits are fingerprints, and said predefined set of possible general patterns comprises the following general patterns: left loop, right loop, arch and spiral.

13. A non-transitory computer-readable program product comprising code instructions for the execution of a method according to claim 1 for the classification of a biometric trait represented by an input image, when said program is executed on a computer.

14. A non-transitory storage means readable by computer equipment whereupon a computer program product comprises code instructions for the execution of a method according to claim 1 for the classification of a biometric trait represented by an input image.

* * * * *